US012190613B2

(12) United States Patent
Zhang et al.

(10) Patent No.: US 12,190,613 B2
(45) Date of Patent: Jan. 7, 2025

(54) HIERARCHICAL SYSTEMS AND METHODS FOR AUTOMATIC CONTAINER TYPE RECOGNITION FROM IMAGES

(71) Applicant: ZEBRA TECHNOLOGIES CORPORATION, Lincolnshire, IL (US)

(72) Inventors: Yan Zhang, Buffalo Grove, IL (US); Tong Shen, Buffalo Grove, IL (US); Santiago Romero, Mount Airy, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/672,179

(22) Filed: Nov. 1, 2019

(65) Prior Publication Data
US 2021/0133470 A1 May 6, 2021

(51) Int. Cl.
*G06V 30/10* (2022.01)
*G06V 10/96* (2022.01)
*G06V 20/64* (2022.01)

(52) U.S. Cl.
CPC ............ *G06V 20/64* (2022.01); *G06V 10/96* (2022.01); *G06V 30/10* (2022.01)

(58) Field of Classification Search
CPC .. G06K 9/00993; G06K 9/00201; G06K 9/40; G06K 9/00624; G06K 2209/01
See application file for complete search history.

(56) References Cited

U.S. PATENT DOCUMENTS

| 10,867,275 | B1* | 12/2020 | Dholakia | B25J 9/0093 |
| 10,949,635 | B2* | 3/2021 | Edwards | G06K 7/1443 |
| 2014/0254951 | A1* | 9/2014 | Salvador | G06T 5/003 |
| | | | | 382/255 |
| 2015/0199589 | A1* | 7/2015 | Suzuki | G06K 9/183 |
| | | | | 382/181 |
| 2017/0178333 | A1* | 6/2017 | Zhang | G06Q 10/083 |
| 2020/0109963 | A1* | 4/2020 | Zass | G05D 1/0246 |
| 2020/0324973 | A1* | 10/2020 | Edwards | G05B 19/042 |
| 2021/0097300 | A1* | 4/2021 | Schmer | G06F 18/254 |

OTHER PUBLICATIONS

Noceti, Nicoletta, Elisabetta Delponte, and Francesca Odone. "Spatio-temporal constraints for on-line 3D object recognition in videos." Computer vision and image understanding 113.12 (2009): 1198-1209.https://www.sciencedirect.com/science/article/pii/S1077314209001088 (Year: 2009).*

* cited by examiner

*Primary Examiner* — Wesley J Tucker
*Assistant Examiner* — Han Hoang

(57) ABSTRACT

Hierarchical systems and methods for automatic container type recognition from images are disclosed herein. An example embodiment includes a system for image analysis, comprising: a container recognition component; a character recognition component; and a 3D point cloud component; wherein the container recognition component is configured to receive an image and produce one of three outputs based on analysis of the image such that the output corresponds to either a container is identified, further analysis is performed by the character recognition component, or further analysis is performed by the 3D point cloud component.

18 Claims, 5 Drawing Sheets

HIERARCHICAL SYSTEMS AND METHODS FOR AUTOMATIC CONTAINER TYPE RECOGNITION FROM IMAGES

BACKGROUND

Current container loading analytics may rely upon a container owner providing a type of container in advance to the analytics provider. This methodology may introduce latency, and errors into the analytics process. Furthermore, some analytics customers may not have container data, or they may not be inclined to share that data with an analytics provider.

SUMMARY

In an embodiment, the present invention is a system for image analysis. The system may comprise a container recognition component; a character recognition component; and a 3D point cloud component; wherein the container recognition component is configured to receive an image and produce one of three outputs based on analysis of the image such that the output corresponds to either a container is identified, further analysis is performed by the character recognition component, or further analysis is performed by the 3D point cloud component.

In another embodiment, the present invention is a method for image analysis. The method may comprise receiving, at a container recognition component, an image; analyzing, at the container recognition component, the image; and generating, at the container recognition component, an output that corresponds to either a container is identified, further analysis is performed by a character recognition component, or further analysis is performed by a 3D point cloud component.

In yet another embodiment, the present invention is a tangible machine-readable medium comprising instructions for image analysis. The instructions when executed, cause a machine to at least receive an image; analyze the image; and generate an output that corresponds to either a container is identified by a container recognition component, further analysis is performed by a character recognition component, or further analysis is performed by a 3D point cloud component.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
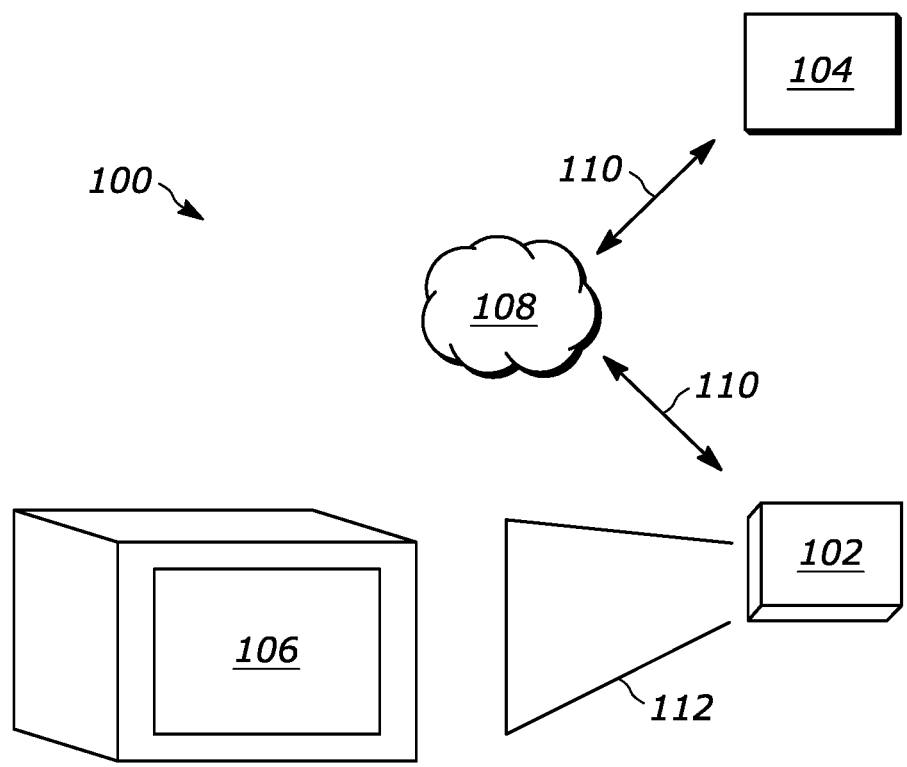
FIG. 1 illustrates an example system for image analysis described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The proposed systems and methods may be able to recognize container/ULD (unit load device) types automatically using machine learning techniques on color images along with computer vision on 3D point cloud to achieve high recognition accuracy. In particular, the present disclosure relates to hierarchical systems and methods for automatic container type recognition from images.

This disclosure enables a container loading analytics system to run as a standalone solution without relying on customer data which could be unavailable, delayed, or contain error. This disclosure proposes a hierarchical method to automatically recognize container/ULD types from RGB-D images using machine learning and 3D computer vision techniques. Deep learning technique may be first used to recognize the ULD types based on their visual differences in color images such as shape of the frontal panel or door structure. To further differentiate ULD types that have the same frontal panel shape but different depth, both OCR (optical character recognition) and 3D point cloud analysis are utilized.

In some industries, a variety of different container types are used. It can be difficult to correctly identify what container type is being loaded, and as such latency and error may impact the efficacy of a container loading analytics system. In the air transport industry that ships containers in airplanes a variety of standard containers are used. These containers may look similar or identical from a single image captured by a load monitoring unit.

For example, single-scale containers AMJ and AAD have exactly the same frontal shape/size, and the differences are AMJ is 8 inches deeper than AAD, and both containers have different ID prints (the first three letters are AMJ/AAD followed by unique numerical digits) on the front panel of the container. OCR may therefore be used to recognize the container ID and differentiate AMJ and AAD from each other.

Similarly, split-scale containers AKE and APE have exactly the same frontal shape/size, and the only difference is AKE is 14 inch deeper than APE. Typically, their container ID is hardly readable, and as such, a 3D point cloud analysis may be utilized to further differentiate AKE/APE by detecting their ceiling lengths since AKE and APE have standard ceiling lengths that a container loading analytics system may be programmed with in advance.

As loading a container usually takes hours to complete, the container type on a loading scale doesn't change during that same loading process. The container type can only change when the container is pulled away and another container is pulled in for a new loading process. The transition between two container loads is reflected in an image of empty loading scales. A temporal filter is therefore developed based on this fact to correct erroneous recognition and inconsistent recognition results which are caused by challenging imaging conditions such as sporadic occlusion and workers blocking the container.

In summary, the embodiments described herein propose a hierarchical framework utilizing machine learning, OCR, 3D computer vision, and temporal filtering techniques that achieved 98%+ accuracy for all seven types of containers listed above.

The 3D point cloud processing used for AKE/APE classification may reside on a load monitoring unit embedded platform to save extra data transfer cost to a backend server. The remaining computation and processing of RGB images may reside on the backend server due to the GPU needed by the container detection software.

The following figures depict example systems, components, and methods that employ the methodologies described herein. In some embodiments, additional, or fewer, systems, components, and methods may be utilized. Additionally, the systems, components, and methods that employ the methodologies described herein may be configured to identify different types of unit loading devices, or containers, by utilizing different machine learning algorithms that have been trained on different datasets for different unit loading devices than the ones described herein.

FIG. 1 illustrates an example system 100 for image analysis such as, for example, a hierarchical method for automatic container type recognition from images. In some embodiments, the system 100 may include additional or fewer components than are depicted in the figured.

FIG. 1 includes an imaging device such as, for example, load monitoring unit 102, a server 104, a unit loading device 106, a network 108, network connections 110, and a field of view 112. In some embodiments, the load monitoring unit 102 may consist of one or more RGB-D cameras capable of capturing RGB images, as well as RGB-D images that incorporate depth into a typical RGB image and a processing board hosting image analysis and communication with the server 104. be a load monitoring unit. Additionally, the load monitoring unit 102 may include a variety of components for image analysis such as, but not limited to, a container recognition component; a character recognition component; and a 3D point cloud component. In other embodiments, the server 104 may include a variety of components such as, but not limited to, a container recognition component; a character recognition component; and a 3D point cloud component. In yet other embodiments, some of the aforementioned components may be stored on the load monitoring unit 102 and others may be stored on the server 104.

The load monitoring unit 102 may be configured such that it is communicatively coupled with a server 104 that may be local, e.g. in close physical proximity to the load monitoring unit 102, or remote, e.g. physically located far away from the load monitoring unit 102, to the load monitoring unit 102. The two devices may communicate with each other over a network 108 via network connections 110. Information may be exchanged between the two, and in some embodiments processing of particular functions, such as image analysis functions, may occur on the load monitoring unit 102, or on the server 104.

The load monitoring unit 102 may be oriented such that it is able to capture images of a unit loading device 106 that is within its field of view 112. The load monitoring unit 102 may be configured so that it continuously captures a sequence of images while it is turned on, or may be configured to capture images only when a unit loading device is present on a loading platform. The unit loading device 106 may be a container for transporting cargo. In some embodiments, the container may be a container that is purpose built for transport in an airplane. There may be a wide variety of different sizes and shapes for the unit loading device 106. Through the use of the image analysis techniques discussed herein the load monitoring unit 102 may be able to automatically detect the dimensions of the unit loading device 106 without any prior information about the dimensions of the container.

In some embodiments, the load monitoring unit 102 in conjunction with the server 104 may be configured to execute the steps for image analysis to determine a container type as described herein. For example, the load monitoring unit 102 may be configured such that it is capable of a hierarchical method for automatic container type recognition from images. In some embodiments, the steps of the method depicted in FIG. 4 may be executed by the load monitoring unit 102, by the server 104, or by the load monitoring unit 102 and server 104 operating in tandem.

Figure 2:
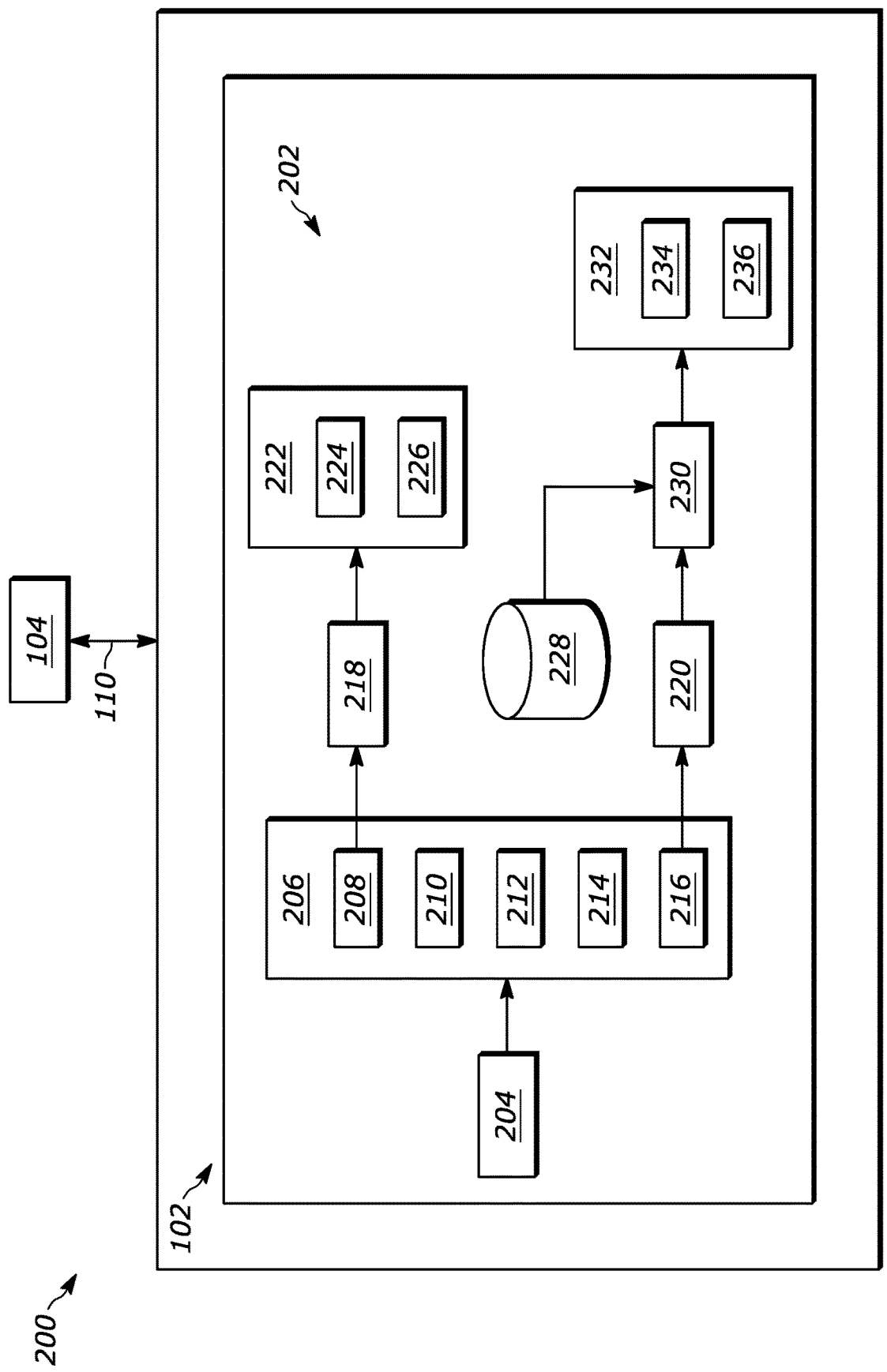
FIG. 2 illustrates an example system for image analysis utilizing a load monitoring unit and a server described herein.

FIG. 2 illustrates an example system 200 for image analysis utilizing a load monitoring unit and a server. In some embodiments, the load monitoring unit is the load monitoring unit 102 of FIG. 1 and the server is the server 104 of FIG. 1. The components depicted as part of the system 200 in FIG. 2 may be configured to execute a hierarchical method for automatic container type recognition from images. The example system 200 may include additional or fewer components than shown in FIG. 2.

FIG. 2 may include an image analysis component 202, a container recognition component 204, a character recognition component 218, and a 3D point cloud component 220. The components of the image analysis component 202 may be communicatively coupled to each other to produce image recognition results, also known as outcomes that correctly identify unit loading devices, also known as containers.

The container recognition component 204 may receive an image capture by the load monitoring unit 102. The container recognition component 204 may be configured to perform unit loading device recognition and localization on the image. An outcome 206 of that analysis may be produced by the container recognition component 204 after analyzing the image. The outcome 206 may include one of five possible outcomes 208, 210, 212, 214, and 216. In other embodiments, the outcome 206 may include additional or fewer outcomes. In some embodiments, outcomes 210, 212, and 214, may correspond to the identification of container types Full Contour aka "SAA", LD8, full aka "AQF," and Demi aka "AYY."

When the outcome 208 is produced additional analysis of the image data may be required by the character recognition component 218. The character recognition component 218 may analyze the image data and be configured to perform optical character recognition "OCR" on the image data. In some embodiments, the character recognition component 218 may be pre-programmed with location data relevant to determining the type of container and "know" where to search in the image data for the characters it is programmed to detect. This may allow for the character recognition component 218 to more efficiently make a determination of container type and save both time and resources. The character recognition component 218 may produce an outcome 222 that includes two possible outcomes 224 and 226. In other embodiments, the outcome 222 may include additional or fewer outcomes. In some embodiments, outcomes 224 and 226 may correspond to the identification of container types M Container aka "AMJ," and A Container aka "AAD."

When the outcome 216 is produced additional analysis of the image data may be required by the 3D point cloud component 220. The 3D point cloud component 220 may receive point cloud data from the load monitoring unit 102 that is derived from constructing a 3D point cloud of the unit loading device captured by the load monitoring unit 102. This 3D point cloud may be derived from an RGB-D image of the container. The 3D point cloud component 220 may receive the 3D point cloud data and perform a ceiling length estimation of the container. By utilizing a pre-trained classification model 228 the 3D point cloud component 220 may apply the model to the 3D point cloud data at operation 230, and produce an outcome 232 that includes two possible outcomes 234 and 236. In other embodiments, the outcome 232 may include additional or fewer outcomes. In some embodiments, outcomes 234 and 236 may correspond to the identification of container types LD3 aka "AKE," and LD2 aka "APE."

In some embodiments, the computations performed by the components depicted in the image analysis component 202 may be performed at solely the load monitoring unit 102, at solely the server 104, or in some combination of at the load monitoring unit 102 and at the server 104. For example, in some embodiments, the operations of the container recognition component 204 may be executed at the server 104 via a data exchange through the network connection 110. Similarly, the operations of the character recognition component 218 may be executed at the server 104 via a data exchange through the network connection 110.

Accordingly, in some embodiments ensuring the integrity of the determined results may be required. Put another way the unit loading device type, e.g. a container, should remain the same during the same loading process same time, and same location. In some cases, unit type recognition from single image frames may have inevitable recognition error. Sporadic occlusion by workers and packages may cause recognition error from single image frames. By applying a coherent constraint on multiple sequential frames the image analysis component 202 may reduce such errors and enforce unit loading device type consistency.

When the recognition result of the current frame can't be decided due to a low level of recognition confidence or other factors, the image analysis component 202 may perform a majority voting on the previous N-frame recognition results to infer the recognition outcome for the current frame. In other words, the image analysis component 202 may "trust and adapt" to the unit load device type history from previous frames if the current frame doesn't yield a high-confident recognition outcome.

Figure 3:
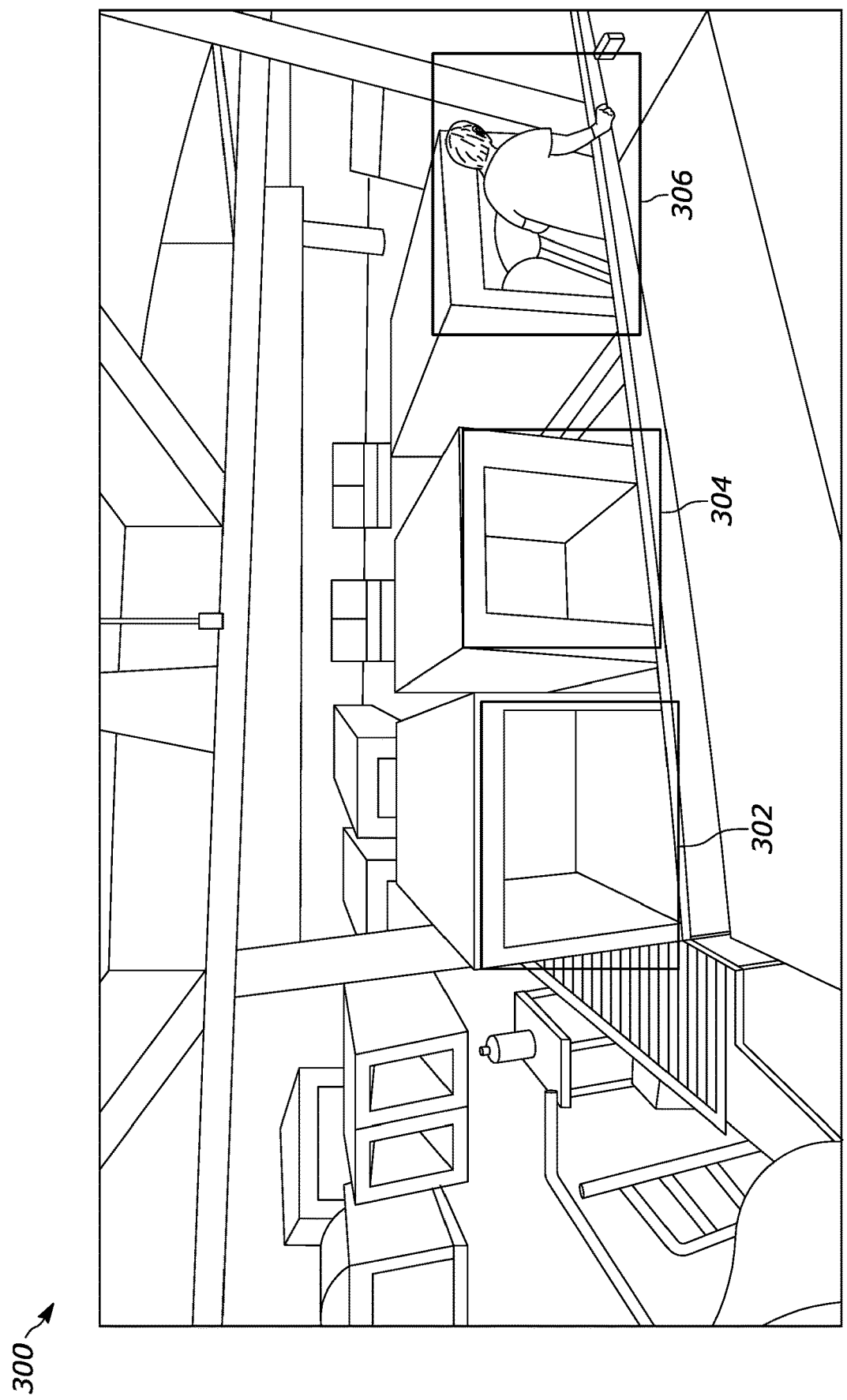
FIG. 3 illustrates an example image depicting containers that may be identified via image analysis performed by the systems and methods described herein.

FIG. 3 illustrates an example image 300 depicting containers that may be identified via image analysis performed by the systems and methods disclosed herein. The example image 300 includes multiple containers that may be identified by the analytics systems and methods disclosed herein.

FIG. 3 includes an image 300 for analysis, a bounding box 302 around a first container included in the image for analysis, a bounding box 304 around a second container included in the image for analysis, and a bounding box 306 around a third container included in the image for analysis. The containers in the image 300 may be analyzed by any of the methods and systems disclosed herein. The bounding boxes may indicate that the load monitoring unit, such as the load monitoring unit 102 of FIG. 1, has correctly identified or is in the process of identifying the type of container.

In some embodiments, the first container, the second container, and the third container may all be of different dimensions such that any analysis of each container may be contingent on accurately identifying the container type prior to performing a container loading analysis.

As shown in FIG. 3, sometimes a worker may occlude part of the image for a container as shown in the bounding box 306 for the third container. The systems and methods described herein are configured to still perform, and accurately identify container types even in the presence of such occlusions.

Figure 4:
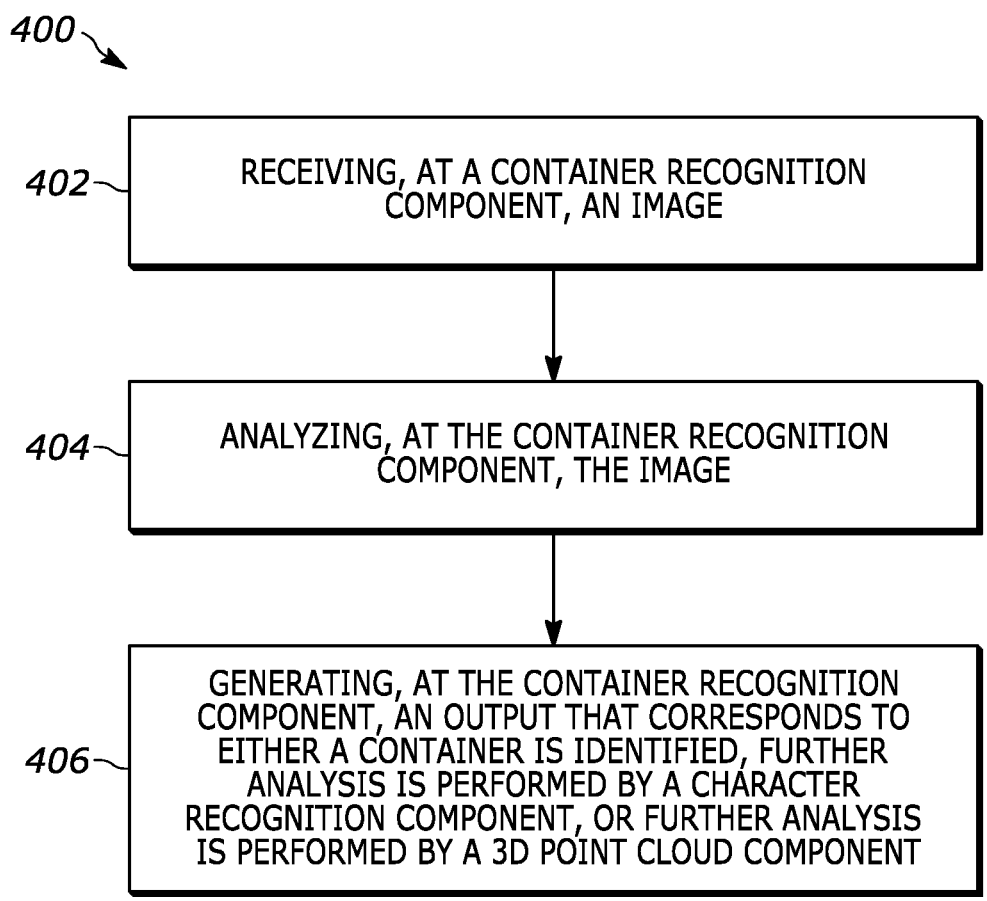
FIG. 4 illustrates an example method for image analysis described herein.

FIG. 4 is a flow diagram of an exemplary computer-implemented image analysis method 400, in accordance with some embodiments. One or more steps of the method 400 may be implemented as a set of instructions on a computer-readable memory and executable on one or more processors.

In one embodiment, the method 400 comprises receiving, at a container recognition component, an image (block 402). The image may be an RGB image that may be captured by the load monitoring unit 102 of FIG. 1. The method may further comprise analyzing, at the container recognition component, the image (block 404); and generating, at the container recognition component, an output that corresponds to either a container is identified, further analysis is performed by a character recognition component, or further analysis is performed by a 3D point cloud component (block 406).

In some embodiments, the method 400 further comprises filtering, at a coherent constraint component, a sequence of images including the received image based on a temporal coherence constraint to remove recognition errors. The coherent constraint component may be a part of the image analysis component 202 depicted in FIG. 2, and in other embodiments the coherent constraint component may be its own component that is part of an image analysis system.

In some embodiments of the method 400, analyzing the image may further comprise analyzing, at the container recognition component, the image using a machine learning algorithm. The machine learning algorithm may be pre-trained on a set of images of unit loading devices, or containers.

Some embodiments of the method 400 may further comprise identifying, at the container recognition component, a container type. The identified container type may be some of the aforementioned container types listed above, or may be other identifiable container types.

Some embodiments of the method 400 wherein when the output corresponds to further analysis is performed by the character recognition component, may further comprise analyzing, at the character recognition component, a subset of the image to identify alphanumeric characters. The identified alphanumeric characters may represent a container identifier code. Accordingly, the container identifier code may represent an identifiable container type, such as the container types described herein, but also any containers, or unit loading devices, that have container identification codes. The identified container type may be some of the aforementioned container types listed above, or may be other identifiable container types.

In some embodiments of the method 400, wherein when the output corresponds to further analysis is needed by the character recognition component, the method may further comprise analyzing, at the 3D point cloud component, a subset of the image to identify a container ceiling attribute. In some embodiments of the method 400, the 3D point cloud component is configured to identify, based on the container ceiling attribute, a container type. The identified container type may be some of the aforementioned container types listed above, or may be other identifiable container types.

Figure 5:
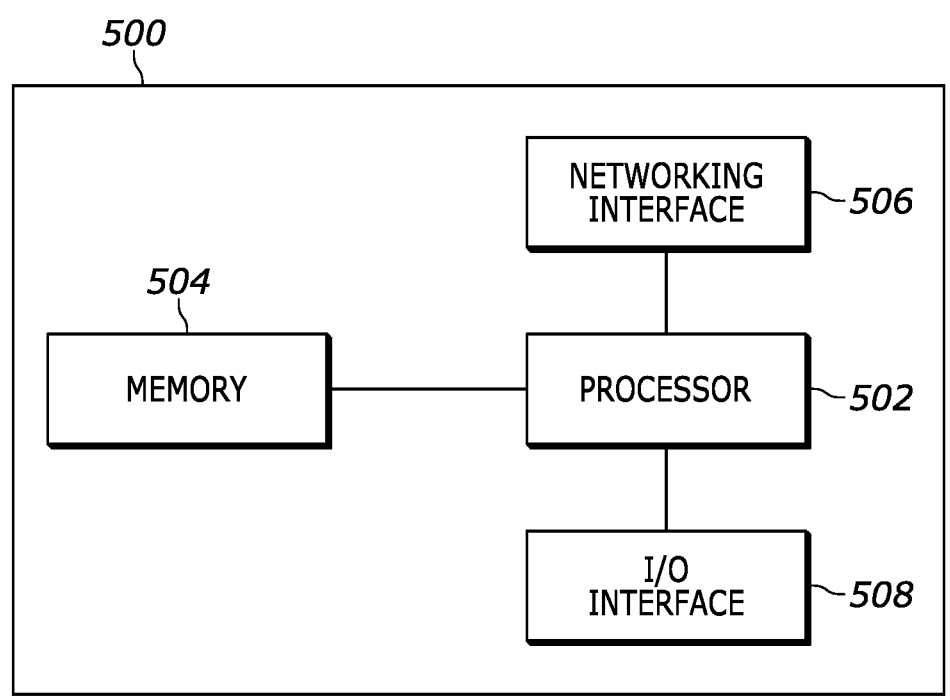
FIG. 5 is a block diagram of an example logic circuit for implementing example methods and/or operations described herein.

FIG. 5 is a block diagram representative of an example logic circuit capable of implementing, for example, one or more components of the example systems 100 of FIG. 1 and 200 of FIG. 2, as well as performing processing necessary to effectuate the method 400 of FIG. 4. The example logic circuit of FIG. 5 is a processing platform 500 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 500 of FIG. 5 includes a processor 502 such as, for example, one or more microprocessors, controllers, and/or any suitable type of processor. The example processing platform 500 of FIG. 5 includes memory (e.g., volatile memory, non-volatile memory) 504 accessible by the processor 502 (e.g., via a memory controller). The example processor 502 interacts with the memory 504 to obtain, for example, machine-readable instructions stored in the memory 504 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 500 to provide access to the machine-readable instructions stored thereon.

The example processing platform 500 of FIG. 5 also includes a network interface 506 to enable communication with other machines via, for example, one or more networks. The example network interface 506 includes any suitable type of communication interface(s) (e.g., wired and/or wireless interfaces) configured to operate in accordance with any suitable protocol(s).

The example, processing platform 500 of FIG. 5 also includes input/output (I/O) interfaces 508 to enable receipt of user input and communication of output data to the user.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system, comprising:
   a container recognition component configured to receive an image and perform container type recognition and localization analysis of the image based on a shape of at least one container present in the image, to produce one of:
   (i) a first output indicating a container type is identified;
   (ii) a second output corresponding to a first set of container types, and
   (iii) a third output corresponding to a second set of container types;
   a character recognition component configured to perform further analysis of the image, responsive to the container recognition component not being able to determine a container type from the first set of container types, to identify alphanumeric characters and determine a container type from the first set of container types; and
   a 3D point cloud component configured to perform further analysis of the image, responsive to the container recognition component not being able to determine a container type from the second set of container types, to determine a container type from the second set of container types,
   wherein, responsive to the container recognition component not being able to produce the one of three outputs satisfying a confidence level, the container recognition component is further configured to apply a temporal coherence constraint on the image and a plurality of previous sequential frames to produce the one of three outputs.

2. The system of claim 1, wherein when the output is that a container is identified, further comprising:
   the container recognition component is further configured to identify the container by analyzing the received image with a machine learning algorithm.

3. The system of claim 1, wherein the character recognition component is configured to perform further analysis of the image by:
   analyzing a subset of the image to identify the alphanumeric characters.

4. The system of claim 3, wherein the identified alphanumeric characters represent a container identifier code.

5. The system of claim 4, wherein the container identifier code represents an identifiable container type.

6. The system of claim 1, wherein the 3D point cloud component is configured to perform further analysis of the image by:
   analyzing a subset of the image to identify a container ceiling attribute.

7. The system of claim 6, wherein the 3D point cloud component is configured to identify, based on the container ceiling attribute, a container type.

8. A method, comprising:
   receiving, at a container recognition component, an image;
   performing, by the container recognition component, container type recognition and localization analysis of the image based on a shape of at least one container present in the image;
   generating, based on the container type recognition and localization analysis of the image by the container recognition component, one of:
   (i) a first output indicating a container type is identified;
   (ii) a second output corresponding to a first set of container types, and
   (iii) a third output corresponding to a second set of container types;
   performing, by a character recognition component, further analysis of the image, responsive to the container recognition component not being able to determine a container type from the first set of container types, to identify alphanumeric characters and determine a container type from the first set of container types;
   performing, by a 3D point cloud component, further analysis of the image, responsive to the container recognition component not being able to determine a container type from the second set of container types, to determine a container type from the second set of container types; and responsive to the container recognition component not being able to produce the one of three outputs satisfying a confidence level, applying, by the container recognition component, a temporal coherence constraint on the image and a plurality of previous sequential frames to produce the one of three outputs.

9. The method of claim 8, further comprising:

filtering, at a coherent constraint component, a sequence of images including the received image based on a temporal coherence constraint to remove recognition errors.

10. The method of claim 8, wherein performing, by the container recognition component, container type recognition and localization analysis of the image based on the shape of the at least one container present in the image further comprises:

analyzing, by the container recognition component, the image using a machine learning algorithm.

11. The method of claim 8, wherein performing, by the character recognition component, further analysis of the image, further comprises:

analyzing, at the character recognition component, a subset of the image to identify the alphanumeric characters.

12. The method of claim 11, wherein the identified alphanumeric characters represent a container identifier code.

13. The method of claim 8, wherein performing, by the 3D point cloud component, further analysis of the image, further comprises:

analyzing, at the 3D point cloud component, a subset of the image to identify a container ceiling attribute.

14. The method of claim 13, wherein the 3D point cloud component is configured to identify, based on the container ceiling attribute, a container type.

15. A tangible machine-readable medium comprising instructions for image analysis that, when executed, cause a machine to at least:

receive an image;

perform, by a container recognition component, container type recognition and localization analysis of the image based on a shape of at least one container present in the image; and generate, based on the container type recognition and localization analysis, one of:
(i) a first output indicating a container type is identified by the container recognition component;
(ii) a second output corresponding to a first set of container types, and
(iii) a third output corresponding to a second set of container types;

perform, by a character recognition component, further analysis of the image, responsive to the container recognition component not being able to determine a container type from the first set of container types, to identify alphanumeric characters and determine a container type from the first set of container types;

perform, by a 3D point cloud component, further analysis of the image, responsive to the container recognition component not being able to determine a container type from the second set of container types, to determine a container type from the second set of container types; and responsive to not being able to generate the one of three outputs satisfying a confidence level, applying a temporal coherence constraint on the image and a plurality of previous sequential frames to produce the one of three outputs.

16. The tangible machine-readable medium of claim 15, further comprising instructions that, when executed, cause the machine to at least:

perform, by the container recognition component, the container type recognition and localization analysis of the image using a machine learning algorithm.

17. The tangible machine-readable medium of claim 15, further comprising instructions that, when executed, cause the machine to at least:

analyze a subset of the image to identify the alphanumeric characters utilizing the character recognition component.

18. The tangible machine-readable medium of claim 15, further comprising instructions that, when executed, cause the machine to at least:

analyze a subset of the image to identify a container ceiling attribute utilizing the 3D point cloud component.

* * * * *